May 24, 1927.

J. MESSNER

TRACTION SHOE

Filed May 11, 1925

1,629,519

John Messner
INVENTOR

BY Victor J. Evans
ATTORNEY

Patented May 24, 1927.

1,629,519

UNITED STATES PATENT OFFICE.

JOHN MESSNER, OF CALUMET, MICHIGAN.

TRACTION SHOE.

Application filed May 11, 1925. Serial No. 29,505.

This invention relates to new and useful improvements in traction shoes and an object of the invention is the provision of a traction shoe for tractors which is detachable to permit its removal from either tractor wheels or tractor chains of a tractor.

Another object of my invention is the provision of a traction shoe which is particularly designed for effective gripping engagement with the chains of a tractor so as to prevent accidental removal of the shoe relative to the chains and yet permit removal of a tread when necessary or desirable.

A further object of my invention is the provision of a traction shoe of the above type having removable calk members which can be quickly and readily placed in position when it is desired to move the tractor over soft or mushy surface, also over frozen ground, ice and snow, as to prevent the usual shoes from slipping through the surface.

Figure 1:
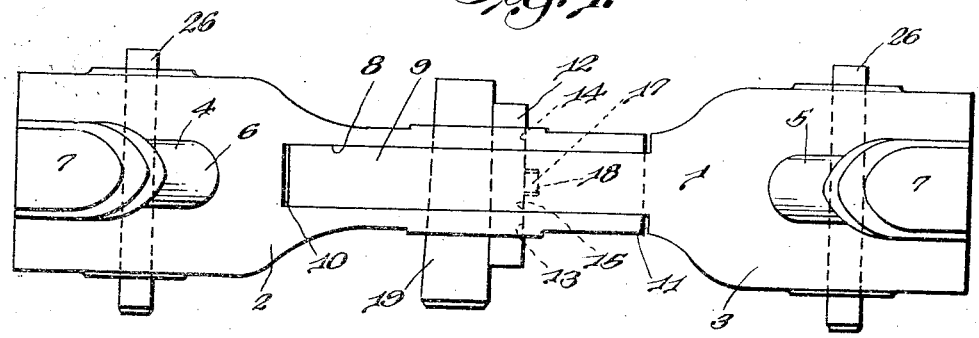
Figure 2:
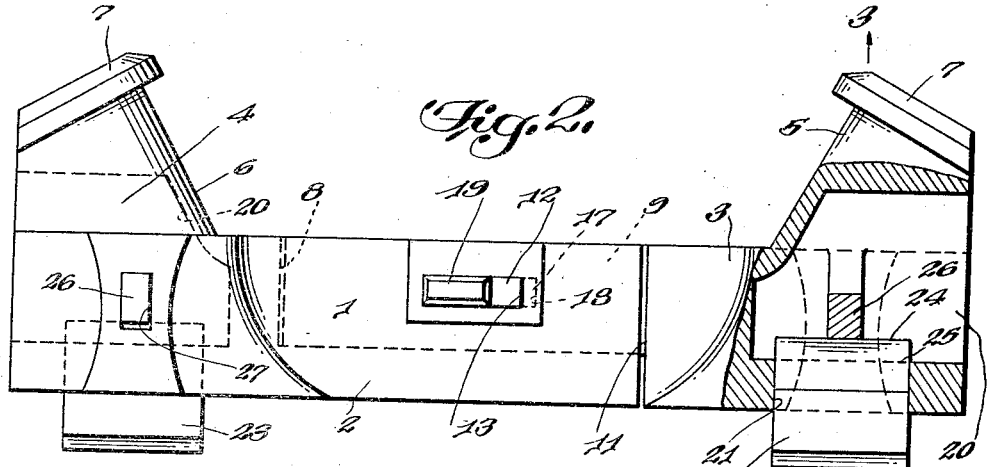
Figure 3:
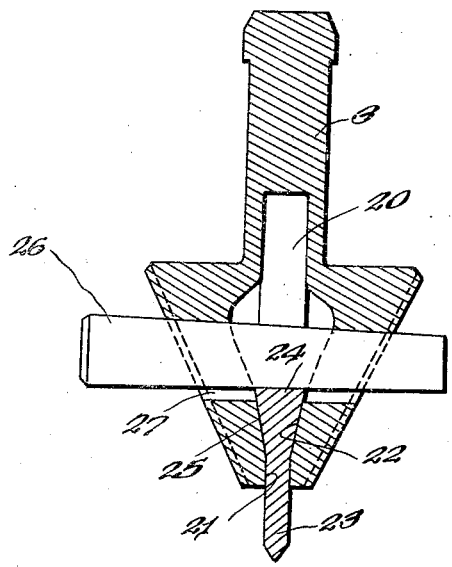
Figure 4:
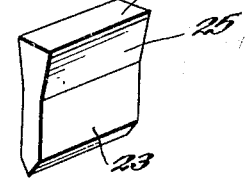

With the above and other objects in view, my invention consists in the novel features of construction and the combination and arrangement of parts to be hereinafter more fully described, pointed out in the claims and shown in the accompanying drawings, in which:

Fig. 1 is a top plan view of a traction shoe constructed in accordance with my invention, Fig. 2 is a side elevation, parts thereof being broken away and illustrated in cross-section, Fig. 3 is a transverse section on the line 3—3 of Figure 2, and Fig 4 is a detail perspective view of one of the calk members.

Referring more particularly to the drawing, the improved traction shoe 1 comprises the main body sections 2 and 3, each of which are substantially pyramidal in shape and have upstanding gripping extensions 4 and 5 formed integrally thereon at their ends. The inner edges of the upstanding projections 4 and 5 are rounded, as clearly shown at 6, and incline outwardly and upwardly from the upper surface of the body sections 2 and 3 for properly fitting and gripping the links of the traction chain of a tractor. Binding plates 7 are formed upon the outer ends of the upstanding gripping extensions 4 and 5 and incline upwardly from the ends of the body sections 2 and 3 as clearly shown in the drawings. The body section 2 is recessed for the major portion of its length providing a substantially pyramidal-shaped recess 8 which telescopically receives the reduced portion 9 of the body section 3. The reduced portion 9 of the body section 3 is slightly shorter than the recess 8 as shown at 10 in Figure 1 of the drawings and the body section 3 is provided with shoulders 11 at the outer terminal of its reduced portion against which shoulders the open end of the body section 2 abuts. The reduced portion 9 fits snugly within the recess 8 and the locking key 12 is inserted through transversely extending aligned openings 13 and 14 formed in the sides of the body section 2 and opening 15 formed in the reduced portion 9 of the body section 3. The locking key 12 is provided with a lateral lug 17 adapted to be seated in a recess 18 formed in the reduced portion 9 of the body section 3 and retained in this position by means of a locking wedge 19 which is inserted through the aligned openings at one side of the key 12, as shown in Figure 1, thus retaining the two body sections against movement relative to each other.

The ends of the body which support the extensions 4 and 5 are substantially hollowed out to form a chamber 20 which is provided in its lower wall with an opening 21 preferably tapered at its inner mouth, as shown at 22 to form a V-shaped seat. The calk member 23 is adapted to be inserted through the opening 21 and the calk is provided with an enlarged inner end portion 24, having tapered shoulders 25 adapted to be seated in the V-shaped recess 22 to prevent the calk from moving outwardly toward the opening 21.

The calks 23 are securely retained in an operative position, as shown in Figure 3 by means of the tapered wedge members 26 which are extended transversely through the ends of the body sections 2 and 3 with one edge thereof engaging the inner end of the calk members while the other edge bears against the upper walls of the aligned openings 27 formed in the sides of the chamber 20. From this construction it will be readily apparent that the calk members 23 may be quickly and readily removed when not needed by first withdrawing the wedge members 26 and moving the calk 23 upwardly into the chamber 20 whence it may be withdrawn from the end of the body sections.

It will be apparent from the foregoing that my invention relates to an improvement on prior Patent No. 1,395,134, granted to me under date of Oct. 28, 1921, and that by providing the removal calks 23 my improved traction shoe may be readily used on comparatively soft and mushy surfaces where the ordinary apex edge of the shoe would have a tendency to slip.

While I have shown and described the preferred form of my invention, it will be obvious that various changes in the details of construction and in the proportions may be resorted to for successfully carrying my invention into practice without sacrificing any of the novel features or departing from the scope of the appended claims.

Having thus described my invention, what I claim is:—

1. In combination, a traction shoe including a body defining opposite hollow end portions and elongated openings in communication with the interior of the hollow end portions, calks adapted for passage within the hollow end portions for projection through the openings, said calks having wedge shaped end portions and said opening having opposite corresponding side walls tapered upwardly and outwardly for cooperation with the wedge shaped end portions of the calks for retaining the calks from complete passage through the openings, and means for holding the calks in operative position with respect to the body.

2. In combination, a traction shoe including a body having opposite hollow end portions and elongated openings in communication with the interior of the hollow end portions, calks adapted for passage within the hollow end portions for projection through the openings, and means extending transversely of the hollow end portions and operatively associated with the calks for preventing self-displacement of said calks.

3. In combination, a traction shoe including a body defining opposite hollow end portions and elongated openings in communication with the interior of the hollow end portions, and calks adapted for passage within the hollow end portions for projection through the openings, said calks having wedge shaped end portions and said opening having opposite corresponding side walls tapered upwardly and outwardly for cooperation with the wedge shaped end portions of the calks for retaining the calks from complete passage through the openings, and means extending transversely of the hollow end portions and operatively associated with the calks for preventing self-displacement of said calks.

In testimony whereof I affix my signature.

JOHN MESSNER.